United States Patent [19]

Shimojima et al.

[11] 3,907,989

[45] Sept. 23, 1975

[54] NOVEL ANTIBIOTIC NO. 1998 AND PROCESS FOR PRODUCING THE SAME

[75] Inventors: Yukiji Shimojima; Yukiko Mizuno, both of Tokyo; Sadayuki Horiguchi, Shizuoka; Masayuki Mizuno, Miyazaki; Tadaaki Ohoka, Shizuoka; Isao Takeda, deceased, late of Osaka, Japan, by Emiko Takeda, legal representative

[73] Assignee: Asahi Kasei Kogyo Kabushiki Kaisha, Osaka, Japan

[22] Filed: May 14, 1974

[21] Appl. No.: 469,870

[30] Foreign Application Priority Data
May 22, 1973 Japan................................ 48-56297

[52] U.S. Cl.................................. 424/118; 195/80
[51] Int. Cl.².......................................... A61K 35/00
[58] Field of Search....................... 424/118; 195/80

[56] References Cited
UNITED STATES PATENTS
3,754,083   8/1973   Shibata et al....................... 424/118

*Primary Examiner*—Jerome D. Goldberg
*Attorney, Agent, or Firm*—Cooper, Dunham, Clark, Griffin & Moran

[57] ABSTRACT

A novel antibiotic No. 1998 useful for medicaments and animal drugs which is obtained by aerobically culturing Bacillus brevis AS 1998 (NRRL B-8029) (FERM P-1989).

3 Claims, 2 Drawing Figures

NOVEL ANTIBIOTIC NO. 1998 AND PROCESS FOR PRODUCING THE SAME

This invention relates to a novel antibiotic No. 1998 or a pharmaceutically acceptable salt thereof, and to a process for procuding the same. More particularly, the antibiotic No. 1998 or a pharmaceutically acceptable salt thereof is produced by aerobically culturing in a medium an antibiotic No. 1998-producing microorganism belonging to the genus Bacillus, and then recovering the antibiotic or its salt from the culture liquor.

The novel antibiotic No. 1998 and its salts have strong antibiotic activities against Gram positive and negative bacteria, and are effective against diseases derived from *Staphylococcus aureus* and *Vibrio metschnikovii*.

Known antibiotics produced by microorganisms of the genus Bacillus include Bacitracin, Colistin, Gramicidin, Tyrothricin, Polymixin, Brevolin, etc. all of which are so-called peptide type antibiotics.

The present antibiotic No. 1998 is a novel antibiotic that is not included in the category of these typical peptides. Its hydrochloride has the physicochemical properties and biological activities as set forth below.

Figure 1:
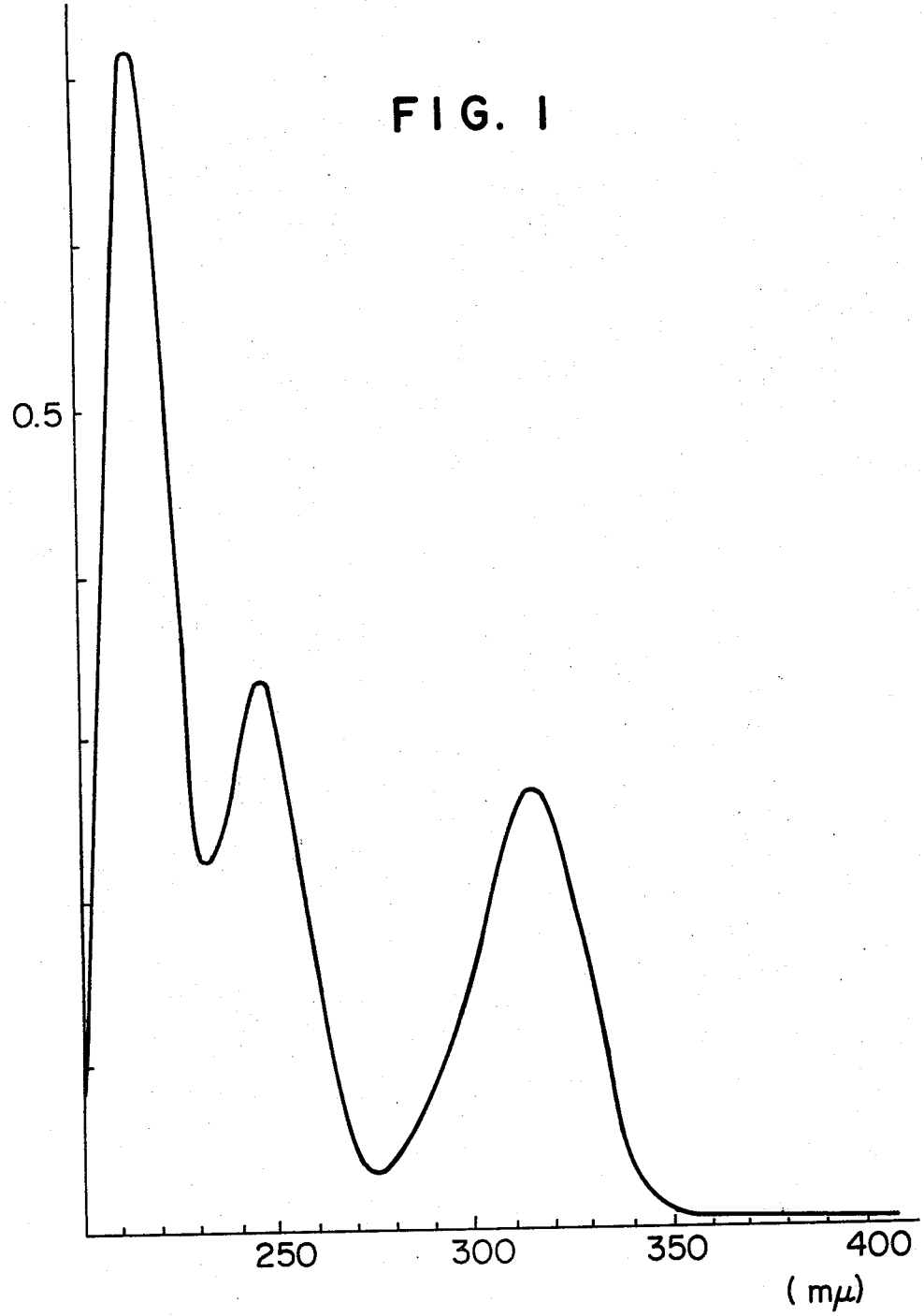
Figure 2:
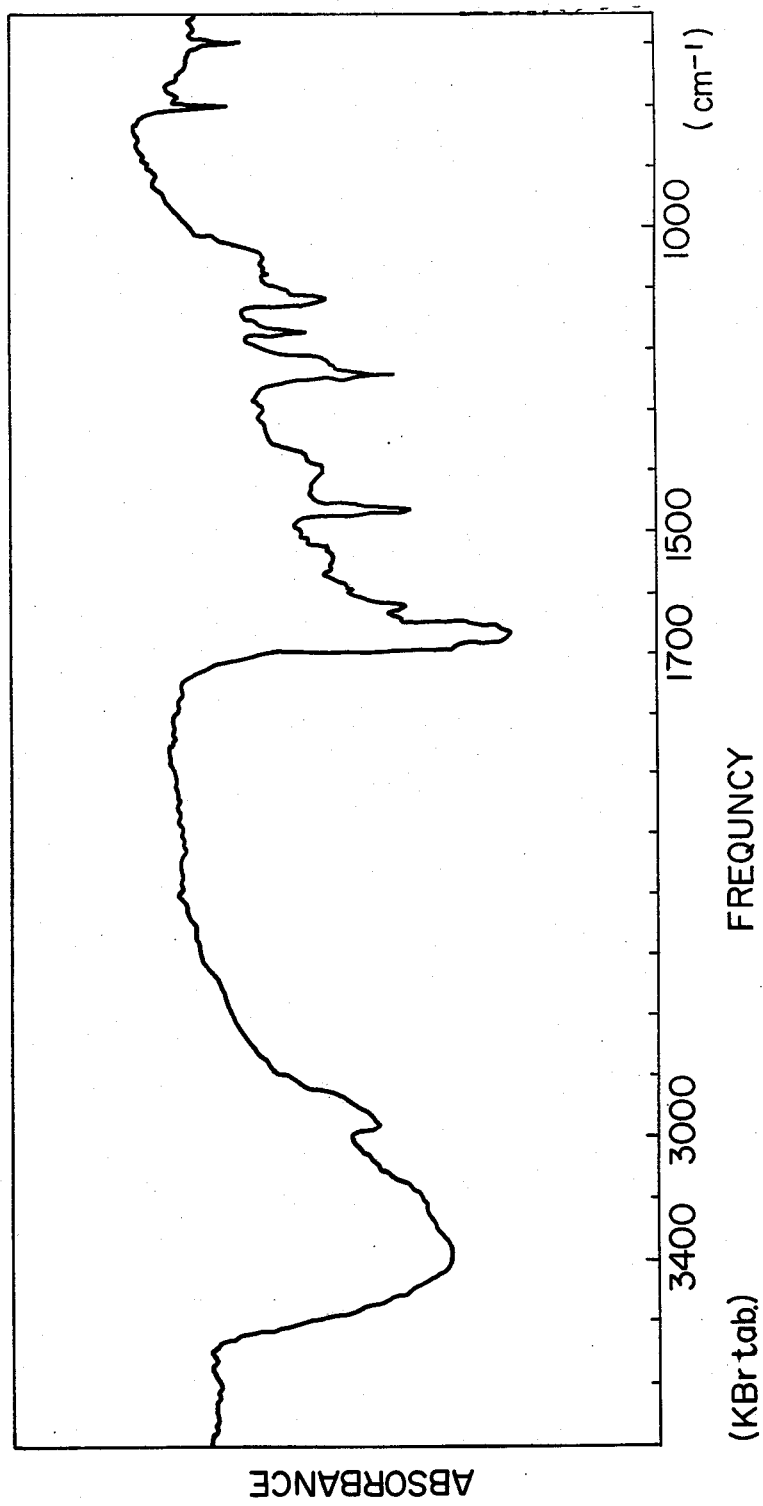

I. Physicochemical properties:
  1. White powder
  2. Melting point: 142° to 145°C.
  3. Elementary analysis: C 50.1%, H 6.3%, N 7.6%, O 24.1%, Cl 12.78%
  4. Molecular weight: 540 (measured according to vapor pressure osmosis method)
  5. Molecular formula: $C_{23}H_{34}N_3O_8Cl_2$ (infrared from said elementary analysis and molecular weight)
  6. Optical rotation: $[\alpha]_D^{19} = -89.0$ (concentration = 1 %, in ethanol)
  7. Solubility: Easily soluble in lower alcohols such as methanol, ethanol and butanol, and in dioxane. Soluble in acetone and water. Sparingly soluble in ethyl acetate and chloroform. Insoluble in n-hexane, petroleum ether and benzene.
  8. Ultraviolet absorption spectrum: As shown in the accompanying FIG. 1.
  9. Infrared absorption spectrum: As shown in the accompanying FIG. 2.
  10. Stability: Stable at pH 3 to pH 8, gradually inactivated at pH 9 or higher even at room temperature.
  11. Color reaction:
    Ferric chloride + Reddish purple
    Erlich reaction + Yellow
    Nitroprusside (alkaline side) + Red
    Ninhydrin + Pinkish yellow
    Potassium permanganate (alkaline side) — Decoloration
    Dragendorff reaction
    Biuret reaction (Green)
    Molisch reaction
    Ammoniac silver nitrate
  12. Rf values on paper chromatogram: n-Butanol : acetic acid : water = 4 : 1 : 5 (by volume ratio), upper layer 0.65. n-Butanol : pyridine : acetic acid : water = 15 : 10 : 3 : 12 (by volume ratio), 0.81. Aqueous saturated n-Butanol, 0.40. Water, 0.12, 50% Acetone, 0.90. 3% Ammonium chloride, 0.71.

The detection was conducted according to bioautogram using *Staphylococcus aureus* and to bluish white fluorescence under an ultraviolet lamp.

II. Biological activities:

| Test microorganisms | Minimum inhibitory concentration ($\mu$g/ml) |
|---|---|
| Escherichia coli K-12 | 6.25 |
| Vibrio metschnikovii IAM 1039 | 1 |
| Pseudomonas aeruginosa | 100 |
| Xanthomonas oryzae IFO 3835 | 100 |
| Salmonella typhimurium | ≧100 |
| Porteus vulgaris IFO 3045 | >100 |
| Alcaligenes faecalis IFO 3160 | >100 |
| Staphylococcus aureus FDA 209 | 2.5 |
| Micrococcus flavas IFO 3242 | ≧100 |
| Sartina lutea | ≧100 |
| Serratia marcescens IFO 3046 | >100 |
| Bacillus subtilis | >100 |
| Corynebacterium sepedonicum IFO 3306 | ≧100 |
| Microbacterium 607 | >100 |
| Candida albicans IFO 0583 | ≧100 |

(The test was conducted according to agar streak method using bouillon as a medium.

Acute toxicity to mice:
  Intra-peritoneal $LD_{50}$ : 8.7 mg/kg.
  Oral $LD_{50}$ : 275 mg/kg.

Therapeutic effects on experimental infectious diseases of animals:

|  | Subcutaneous ($CD_{50}$) | Oral ($CD_{50}$) |
|---|---|---|
| Staphylococcus aureus (in mice) | 10.5 | 26.5 (mg/kg) |
| Vibrio metschnikovii (in cock) | 3.5 | 10.2 |

(The $CD_{50}$ is the dose effective to give 50% survival.)

The microorganism suitable for production of the present antibiotic is a strain, which has been identified as a species belonging to the genus Bacillus. Artificial mutants thereof may also be used.

Microbiological properties of the said microorganism are as mentioned below.

a. Growth on various media:
  1. Nutrient broth: Substantially uniform turbidity. No pellicle.
  2. Broth agar: Colonies smooth, sometimes rough, spreading to flat. Opaque to translucent, ivory through white to cream-colored.
  3. Glucose broth agar: Growth better than on broth agar, appearance substantially identical therewith.
  4. Gelatin: Gradual liquefaction.
  5. Peptone water: Growth somewhat restricted, more or less turbidity.
  6. Litmus milk: Milk not coagulated nor peptonized. Litmus not discolored.
  7. Potato: Pale yellowish brown growth, spreading, with fine wrinkles.
  8. Glucose bouillon: Short rods, 0.5 to 0.9 by 2 to 5 microns. Gram positive. Spores ellipsoidal to cylindrical.

b. Physiological properties:
  1. Optimum growth conditions: pH 5 to 8, 27° to 40°C., aerobic.
  2. Growth conditions: pH 4 to 9, 5° to 50°C., aerobic.
  3. Gram staining: Positive
  4. Acid fastness: Negative
  5. Methyl Red test: Positive
  6. Voges-Proskauer test (formation of acetylmethylcarbinol): Positive
  7. Formation of indole: Negative 8. Formation of hydrogen sulfide: Negative
9. Formation of ammonia: Negative
10. Reduction of nitrates: Negative
11. Formation of catalase: Positive
12. Gelatin liquefaction: Gradual
13. Starch hydrolysis: Negative
14. Utilization of citric acid: Positive
15. Coagulation of milk: Negative
16. Reduction of pigments such as litmus, Methylene Blue, etc.: Negative
17. Utilization of urea: Negative c. Utilization of carbon sources:

Acid from fructose, saccharose, glucose and glycerin, but no gas nor acid from mannose, $\alpha$-methyl glucoside, inulin, inositol, arabinose, xylose, maltose, salicin, galactose, sorbitol, raffinose, trehalose, dextrin and cellulose.

These properties have been examined according to Bergey's Mannual of Determinative Bacteriology, Seventh Edition (1957), and it has been determined that the most fundamental and important properties for identification coincide with those of a strain of the species Bacillus brevis. The main difference in properties between Bacillus brevis ATCC 8185 and the present strain was that the former was positive in Gram variation and negative in Voges-Proskauer test, whereas the latter negative in Gram variation and positive in said test. However, even when said Bacillus brevis ATCC 8185 was cultured in a medium for production of the antibiotic No. 1998, the antibiotic of the present invention was not produced at all. In view of the above, the strain is considered to be a variant belonging to the species Bacillus brevis, and named the strain Bacillus brevis AS 1998. The present strain has been deposited with NRRL under the deposition No. B-8029.

In addition, all of antibiotic No. 1998-producing strains belonging to the genus Bacillus can be used in the present invention.

The fermentation and recovery steps in the present invention are effected according to conventional procedures adopted in the production of fermentation products. That is, the antibiotic No. 1998-producing strain is aerobically cultured in a medium containing required nutrient sources, and, from the culture filtrate, the antibiotic No. 1998 is recovered by combination of various isolation and purification procedures, taking advantage of the aforesaid physicochemical properties of the antibiotic No. 1998.

As the nutrient sources, there are used carbon sources, nitrogen sources, inorganic salts and, if necessary, vitamins and various nutrient factors or precursors necessary for the growth of the strain used. Examples of the carbon sources include glucose, sucrose, mannitol, trehalose, fructose, glycerin, organic acids and molasses; examples of the nitrogen sources include peptone, soybean meal, corn steep liquor, amino acids, yeast extract, meat extract and ammonium salts; and examples of the inorganic salts include sodium chloride, potassium chloride, calcium chloride, magnesium sulfate and inorganic phosphates.

The cultivation is conducted under aerobic conditions at a pH of 5 to 8 at a temperature of 27° to 40°C. for 12 to 72 hours.

After completion of the cultivation, the antibiotic No. 1998 is recovered from the culture liquor according to a method adopted for the recovery of general fermentation products. For example, an extraction method using organic solvents may be properly combined with gel filtration or the like chromatography using ion exchangers or adsorbents. An embodiment of such recovery method is as mentioned below.

The culture liquor is adjusted to a pH of 3 by use of a mineral acid, and subjected to centrifugation. The supernatant is adjusted to a pH of 6 to 7 by addition of an alkali, and then passed through a column packed with a cation exchange resin, e.g. Amberlite IRC-50 (H-form) produced by Rhom and Haas Co., whereby the antibiotic No. 1998 is adsorbed on the resin. The column is washed with water and then eluted with dilute mineral acid water. Fractions having antimicrobial activities against Staphylococcus aureus are collected and neutralized with a weakly basic anion exchange resin, e.g. Amberlite IR-45 (OH-form). The neutralized liquid is concentrated in vacuo to the form of syrup, and extracted with a $C_1$–$C_3$ lower alcohol or dioxane. After removing insolubles, the liquid is properly concentrated and then subjected to a column containing Cephadex LH-20, which has been equilibrated with a $C_1$–$C_3$ lower alcohol. Subsequently, gel filtration is effected by use of the same solvent as above, whereby the active substance is eluted separately from a major proportion of brown substance. The active fractions are concentrated in vacuo, and then subjected to column chromatography, using a mixed solvent comprising n-butanol, acetone and water in a volume ratio of 4:5:1, in a column containing cellulose, e.g. "Avicel" produced by FMC Co., which has been packed with the said mixed solvent. Fractions showing activities against Staphylococcus aureus are collected and concentrated. To the resulting syrupy concentrate, ethyl ether is added with stirring, whereby the desired substance is obtained as a white precipitate. The precipitate is washed with ether and then dried to obtain a salt of the antibiotic No. 1998 as a white powder. According to its application purpose, the antibiotic No. 1998 may be brought to the form of any pharmaceutically acceptable salt, e.g. hydrochloric acid salt, sulfuric acid salt or acetic acid salt. Alternatively, the antibiotic No. 1998 may be recovered as a crude powder by extracting the said substance from the culture filtrate with a water-immiscible lower alcohol, and then removing the solvent.

Procedures for producing the antibiotic No. 1998 of the present invention are illustrated below with reference to examples, but the examples do not limit the scope of the invention.

EXAMPLE 1

Bacillus brevis AS-1998 (NRRL B-8029) (FERM P-1989) was inoculated to a 500 ml. shaking flask containing 100 ml. of a medium comprising 1% of defatted soybean meal and 1% of corn steep liquor (pH 7 before sterilization), and then shaken reciprocally at 30°C. for 24 hours to prepare a seed culture. The seed culture was inoculated, in a proportion of 5%, to a jar fermentor containing 5 liters of the same medium as above, and cultured at 30°C. for 16 hours, while introducing 5 liters of air per minute and stirring at a speed of 500 r.p.m. Thereafter, the content of the fermentor was adjusted to pH 3 by addition of 6N-hydrochloric acid and subjected to a continuous centrifugal separator, and only the culture liquor was recovered. The culture liquor was adjusted to pH 7 with 6N-sodium hydroxide and then flowed downwardly through a column packed with 300 ml. of an ion exchange resin IRC-50 (H-form). After careful washing with water, the column was eluted with 0.05N-hydrochloric acid, and only fractions showing antimicrobial activities against a test microorganism *Staphylococcus aureus* were collected. The collected fraction was neutralized with a weakly basic ion exchange resin IR-45 (OH-form). The neutralized liquid was concentrated in vacuo to a syrupy state, and the concentrate was subjected to methanol extraction to remove insolubles therefrom. Subsequently, the concentrate was subjected to a column containing Cephadex LH-20, which has been equilibrated with methanol, and then methanol was flowed downwardly through the column to carry out gel filtration. Only fractions having antimicrobial activities were collected and then concentrated in vacuo. The concentrate was further purified by column chromatography using fine crystalline cellulose "Avicel" (produced by FMC Co.). That is, the concentrate was adsorbed on a column (inner diameter 3.5 cm., length 80 cm.) containing "Avicel", which has been packed with a mixed solvent comprising n-butanol, acetone and water in a volume ratio of 4:5:1, and then subjected to chromatography using the same solvent as above.

The eluates, each 10 ml. in volume, were fractionated by means of a fraction collector, and only fractions containing active substance were collected. To the collected fraction was added about 10 times the volume thereof of ethyl ether. The resulting mixture was allowed to stand overnight in a refrigerator to deposit a precipitate. The precipitate was recovered, washed with a small amount of ethyl ether, and then dried to obtain about 260 mg. of a hydrochloride of the antibiotic No. 1998 in the form of a white powder. The thus obtained white powder had such physicochemical properties and biological activities as detailed previously.

EXAMPLE 2

*Bacillus brevis* AS 1998 (NRRL B-8029) (FERM P-1989) was inoculated to a 500 ml. shaking flask containing 100 ml. of a medium comprising 1% of defatted soybean meal, 1% of glucose, 0.2% of dipotassium phosphate, 0.05% of magnesium sulfate, 0.001% of calcium chloride and 0.3% of sodium chloride (pH 7 before sterilization), and then shaken reciprocally at 30°C. for 24 hours. 2 Liters of the thus obtained culture liquor was centrifuged to remove the cells. The supernatant was extracted 2 times with 700 ml. of n-butanol. The extract was concentrated to a substantially syrupy state, and the concentrate was subjected to methanol extraction to remove insolubles. The methanol extract was concentrated to about 10 ml. and then charged into a column containing Cephadex LH-20, which had been equilibrated with methanol. Subsequently, gel filtration was conducted by flowing methanol downwardly through the column. Only fractions showing antimicrobial activities against a test microorganism *Staphylococcus aureus* were collected. The collected fraction was concentrated to dryness in vacuo to obtain 120 mg. of crude antibiotic No. 1998 as a pale yellowish brown powder. For further purification, the crude antibiotic may be subjected to cellulose column chromatography according to Example 1.

Percent referred to above is weight/volume percent.

What we claim is:

1. An antibiotic No. 1998, or pharmaceutically acceptable salts thereof, whose hydrochloride has a melting point of 142° to 145°C., a molecular weight of 540 (according to vapor pressure osmosis method), elementary analysis values of C 50.1%, H 6.3%, N 7.6%, O 24.1% and Cl 12.78% and the infrared curve illustrated in FIG. 2 hereof.

2. A process for producing antibiotic No. 1998 which comprises aerobically culturing Bacillus brevis NRRL B-8029 in a medium containing a carbon source, a nitrogen source, inorganic salts and nutriments at a pH of 4 to 9 and at a temperature of 5° to 50°C., until substantial antibiotic activity has been imported to said medium and recovering antibiotic No. 1998 accumulated in the medium.

3. A process according to claim 2, wherein pH is 5 to 8 and the temperature is 27° to 40°C.

* * * * *